United States Patent
Kamiya

(10) Patent No.: US 10,364,840 B2
(45) Date of Patent: Jul. 30, 2019

(54) FAILURE DETECTION DEVICE FOR SPINDLE HEAD OF MACHINE TOOL INCLUDING A PLURALITY OF SENSORS

(71) Applicant: FANUC CORPORATION, Yamanashi (JP)

(72) Inventor: Yohei Kamiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/959,952

(22) Filed: Apr. 23, 2018

(65) Prior Publication Data

US 2018/0313403 A1  Nov. 1, 2018

(30) Foreign Application Priority Data

Apr. 28, 2017 (JP) .................. 2017-090802

(51) Int. Cl.
  *F16C 19/52* (2006.01)
  *G05B 19/18* (2006.01)
  *G07C 3/08* (2006.01)
  *G07C 3/00* (2006.01)

(52) U.S. Cl.
  CPC .......... *F16C 19/527* (2013.01); *G05B 19/182* (2013.01); *G07C 3/00* (2013.01); *G07C 3/08* (2013.01); *G05B 2219/37435* (2013.01)

(58) Field of Classification Search
  CPC ...... F16C 19/527; F16C 19/52; G05B 19/182; G07C 3/08
  See application file for complete search history.

(56) References Cited

U.S. PATENT DOCUMENTS 9,335,317 B2 * 5/2016 Matsubara ............ G01M 13/04
2016/0341631 A1 * 11/2016 Kamiya ................ G01M 13/00

FOREIGN PATENT DOCUMENTS

| JP | 2003166696 A | 6/2003 |
| JP | 2005351363 A | 12/2005 |
| JP | 2011-060076 A | 3/2011 |
| JP | 2016-131004 A | 7/2016 |
| WO | 2016/133100 | 8/2016 |
| WO | 2017188314 A1 | 11/2017 |

* cited by examiner

*Primary Examiner* — David Z Huang
(74) *Attorney, Agent, or Firm* — RatnerPrestia

(57) ABSTRACT

A failure detection device includes a formaldehyde sensor that detects the generation of formaldehyde, a vibration sensor that detects vibration of a spindle head, and a machine controller that detects the occurrence of an abnormality of a spindle bearing. The machine controller determines the occurrence of the abnormality of the spindle bearing and a cause of the abnormality based on a change in the output value of the formaldehyde sensor over time and a change in the output value of the vibration sensor over time.

7 Claims, 7 Drawing Sheets

FAILURE DETECTION DEVICE FOR SPINDLE HEAD OF MACHINE TOOL INCLUDING A PLURALITY OF SENSORS

CROSS-REFERENCE TO RELATED APPLICATION

This application is a new U.S. Patent Application that claim benefit of Japanese Patent Application No. 2017-090802, filed Apr. 28, 2017, the disclosure of this application is being incorporated herein by reference in its entirety for all purposes.

BACKGROUND OF THE INVENTION

1. Field of the Invention

The present invention relates to a failure detection device for the spindle head of a machine tool including a plurality of sensors.

2. Description of the Related Art

A machine tool can machine a workpiece into a desired shape by moving a spindle head relative to the workpiece. The spindle head includes a spindle for holding a tool and a spindle motor for rotating the spindle. The spindle motor is driven so as to rotate the tool around an axis. The spindle head has a bearing that rotatably supports the spindle and the shaft of the spindle motor. Moreover, the spindle motor has an oil seal that prevents coolant from entering between the shaft and the case of the spindle motor. The bearing and the oil seal deteriorate over time by using the spindle head. The bearing and the oil seal may become defective due to the entry of foreign matters thereinto.

In the related art, it is known that a temperature sensor, a vibration sensor, etc., is disposed in a machine tool and abnormality of the machine tool is detected (For example, see WO2016/133100 and Japanese Unexamined Patent Publication No. 2011-60076). Furthermore, it is known that a humidity sensor or a gas sensor is disposed instead of the temperature sensor or the like so as to detect the failure of a bearing (For example, see Japanese Unexamined Patent Publication No. 2016-131004).

SUMMARY OF THE INVENTION

In the related art, a vibration sensor is attached to a spindle head in order to detect the failure of the spindle head. Alternatively, an AE sensor for detecting elastic wave is attached to the spindle head. When the output value of the vibration sensor or the output value of the AE sensor increases, it can be determined that an abnormality of the spindle head has occurred. Alternatively, a plurality of vibration sensors may be attached to the spindle head.

However, if a single vibration sensor is attached to the spindle head, it is difficult to identify the member in which the abnormality occurs even when the output value of the vibration sensor increases. Even if a plurality of vibration sensors are attached to the spindle head, one defective member increases vibration over the spindle head and thus it is difficult to identify the member in which the abnormality occurs. Moreover, it is difficult to determine the cause of the abnormality of the member. The operator needs to disassemble the spindle head in order to identify the member in which the abnormality occurs or to determine the cause of the abnormality.

A failure detection device according to an aspect of the present disclosure detects abnormality of the spindle head of a machine tool. The failure detection device includes first sensor that detects the generation of predetermined first gas in the spindle head, and second sensor that detects a change in a state of the spindle head that is different from the generation of the first gas. The failure detection device includes a controller that determines whether at least one of a bearing and an oil seal that are arranged in the spindle head is abnormal or not. The second sensor is one of a gas sensor that detects the generation of predetermined second gas in the spindle head, an odor sensor that detects the generation of the second gas in the spindle head, a vibration sensor that detects vibration of the spindle head, a sensor that detects elastic wave generated in the spindle head, and a humidity sensor that detects humidity in the spindle head. The controller determines a member in which the abnormality occurs among the bearing and the oil seal and cause of the abnormality based on a change in the output value of the first sensor over time and a change in the output value of the second sensor over time.

DETAILED DESCRIPTION

Referring to FIGS. 1 to 10, a failure detection device for detecting an abnormality of a machine tool according to an embodiment will be described below. The failure detection device according to the present embodiment detects abnormality of at least one of the bearing and the oil seal of a spindle head.

Figure 1:
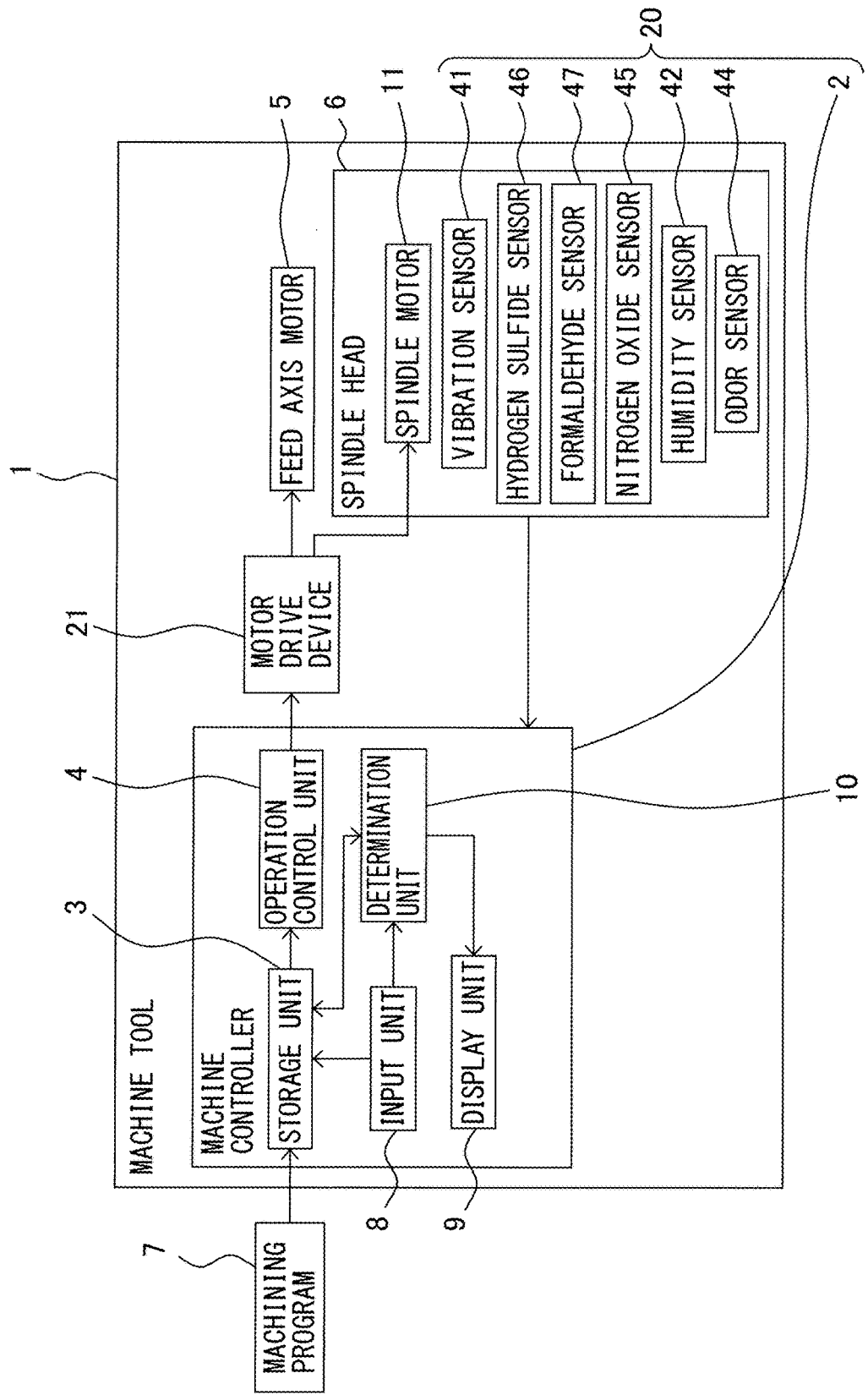
FIG. 1 is a block diagram of first machine tool according to an embodiment.
Figure 2:
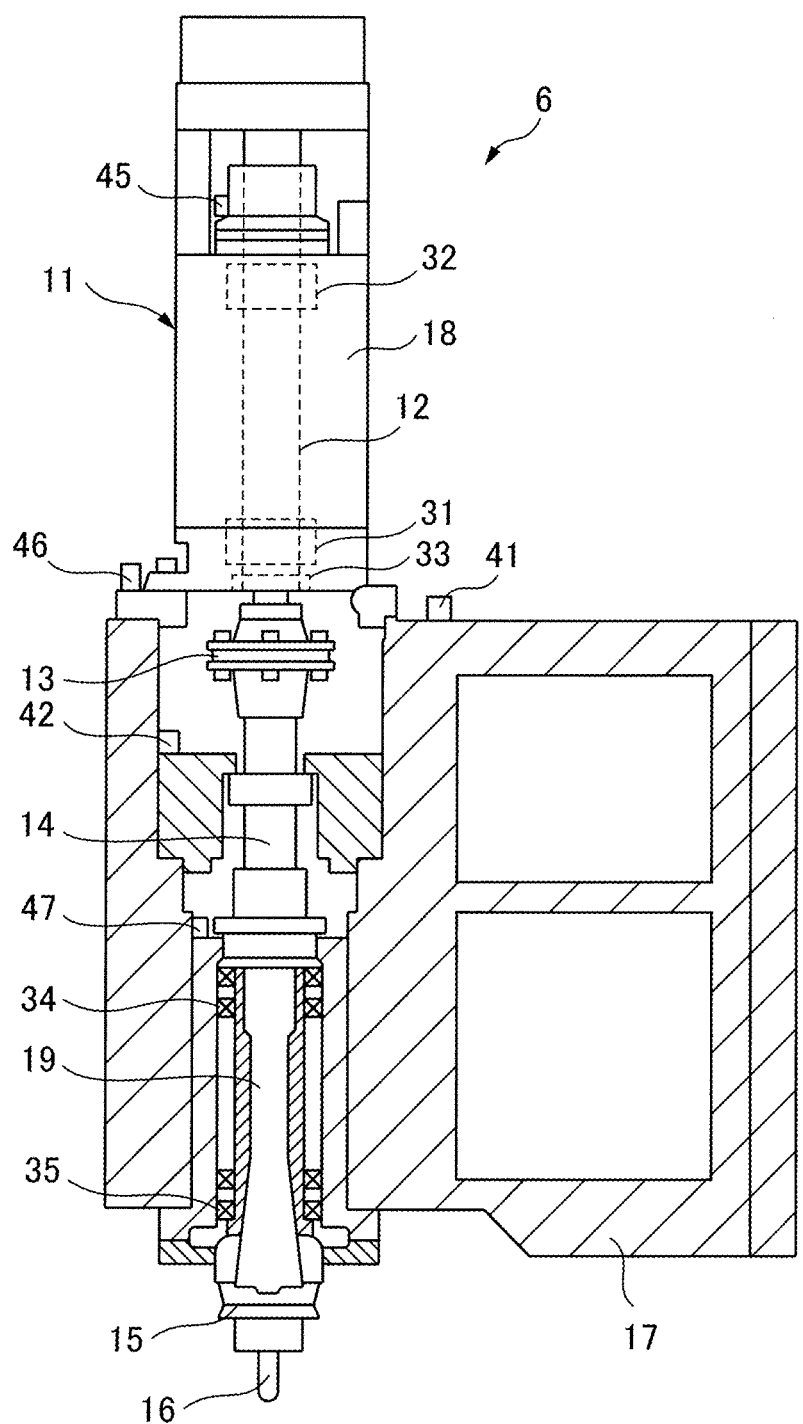
FIG. 2 is a partial cross-sectional view schematically showing a spindle head according to the embodiment.

FIG. 1 is a block diagram showing first machine tool according to the present embodiment. FIG. 2 is a partial cross-sectional view schematically showing the spindle head according to the present embodiment. Referring to FIGS. 1 and 2, a machine tool 1 machines a workpiece while changing the position of a tool relative to the workpiece. The machine tool 1 has a feed axis where the position of the tool is changed relative to the workpiece. For example, the feed axes includes three linear axes (X axis, Y axis, and Z axis). The feed axis of the machine tool 1 is not limited to this configuration. The feed axis may include any linear axes or rotary feed axes.

The machine tool 1 includes a movement device that moves the workpiece or a tool along the feed axis. The movement device includes a feed axis motor 5 that is disposed for each feed axis. The machine tool 1 includes a spindle head 6 that rotates a tool 16 while holding the tool 16. The spindle head 6 includes a spindle 14 that supports the tool 16 and a spindle motor 11 that rotates the spindle 14. The spindle motor 11 includes a shaft 12 and a case 18 in which the shaft 12 is arranged.

The spindle head 6 includes a housing 17 in which the spindle 14 is arranged. The tool 16 is connected to the spindle 14 via a tool holder 15 and a tool holding member 19. The spindle 14 is connected to the shaft 12 of the spindle motor 11 via a connection member 13. The spindle motor 11 is driven so as to rotate the tool 16 about the axis of the spindle 14. The spindle motor 11 is fixed to the housing 17.

The machine tool 1 includes a machine controller 2 that controls the feed axis motor 5 and the spindle motor 11. The machine controller 2 of the present embodiment is a calculator that includes a CPU (Central Processing Unit), and RAM (Random Access Memory), ROM (Read Only Memory), etc., that are connected to the CPU via a bus.

The machine tool 1 of the present embodiment is a numerically controlled machine tool. A machining program 7 for operating the machine tool 1 is generated in advance by the operator. The machine controller 2 includes a storage unit 3 that stores the machining program 7 and an operation control unit 4 that generates an action command for the motor based on the machining program 7. The machine tool 1 includes a motor drive device 21 that supplies electric power to the feed axis motor 5 and the spindle motor 11 based on the action command generated by the machine controller 2. The motor drive device 21 supplies electric power so as to drive the feed axis motor 5 and the spindle motor 11.

The machine controller 2 includes an input unit 8 where the operator inputs arbitrary information. The input unit 8 is formed by a keyboard etc. The machine controller 2 includes a display unit 9 that displays arbitrary information that relates to the machine tool 1. The display unit 9 is formed by, for example, a liquid crystal display panel.

The spindle head 6 has spindle bearings 34 and 35 that support the spindle 14. The spindle bearings 34 and 35 are, for example, ball bearings. The ball bearing includes an inner ring, an outer ring, balls that is disposed between the inner ring and the outer ring, and a cage for holding the balls. The spindle bearings 34 and 35 are supported by the housing 17. The cage for the spindle bearings 34 and 35 of the present embodiment is made of phenol resin. Grease is disposed as a lubricant in the spindle bearings 34 and 35.

Motor bearings 31 and 32 that support the shaft 12 are arranged in the spindle motor 11. The motor bearings 31 and 32 are, for example, ball bearings. A lubricant is disposed in the motor bearings 31 and 32. Urea grease is used as a lubricant for the motor bearings 31 and 32 of the present embodiment.

Figure 3:
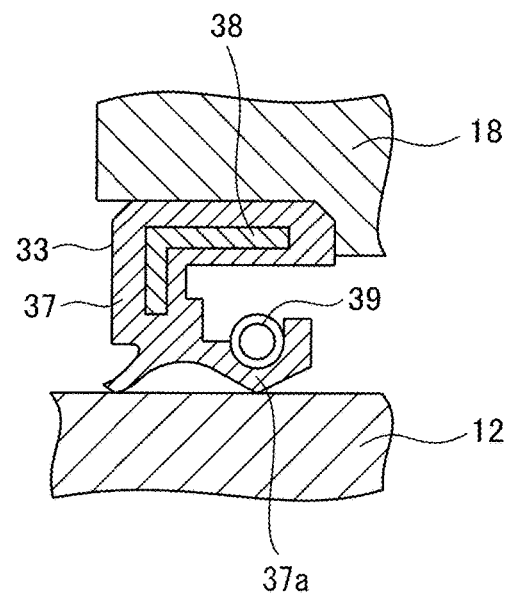
FIG. 3 is a schematic cross-sectional view showing an oil seal according to the embodiment.

FIG. 3 is a schematic cross-sectional view showing the oil seal according to the present embodiment. Referring to FIGS. 2 and 3, the spindle head 6 includes an oil seal 33 that seals an inner space of the spindle motor 11. The oil seal 33 is fixed to the case 18 of the spindle motor 11. The oil seal 33 is disposed at a part where the shaft 12 of the spindle motor 11 protrudes from the case 18.

The oil seal 33 includes an elastic member 37 having a lip part 37*a* that comes contact with the shaft 12. The oil seal 33 includes a metallic ring-shaped member 38 and a spring 39 disposed around the lip part 37*a*. The elastic member 37 is formed in ring-shaped so as to surround the shaft 12. The oil seal 33 provides sealing between the shaft 12 and the case 18. The elastic member 37 of the present embodiment is made of a nitrile rubber.

Referring to FIGS. 1 and 2, the machine tool 1 of the present embodiment includes a failure detection device 20 that detects abnormality of the spindle head 6. The spindle head 6 is composed of a plurality of members. The failure detection device 20 detects the abnormality of at least one of the bearings and the oil seal of the spindle head 6.

The failure detection device 20 includes the machine controller 2. The machine controller 2 acts as a controller that determines whether or not the abnormality occurs in at least one of the bearings and the oil seal. The machine controller 2 of the present embodiment identifies the member in which abnormality occurs among the spindle bearings 34 and 35, the motor bearings 31 and 32, and the oil seal 33. A plurality of sensors are attached to the machine tool 1 in order to detect an operation state or the occurrence of the abnormality. The machine controller 2 identifies the member in which the abnormality occurs based on the output values of the predetermined sensors and determines the cause of the abnormality.

The failure detection device 20 includes a plurality of sensors that detect a change in a state of the spindle head 6. The failure detection device 20 of the present embodiment includes a gas sensor that detects the generation of predetermined gas in the spindle head 6. The gas sensor of the present embodiment detects gas that is not generated in the normal operation of the spindle head 6.

The gas sensor of the failure detection device 20 includes a formaldehyde sensor 47 that detects the generation of formaldehyde. The formaldehyde sensor 47 is formed so as to detect the concentration of formaldehyde. The formaldehyde sensor 47 is located so as to detect formaldehyde that is generated by the spindle bearings 34 and 35. The formaldehyde sensor 47 of the present embodiment is disposed near the spindle bearings 34 and 35 in the housing 17.

The gas sensor of the failure detection device 20 includes a nitrogen oxide sensor 45 that detects the generation of nitrogen oxide. The nitrogen oxide sensor 45 is formed so as to detect the concentration of the nitrogen oxide. The nitrogen oxide sensor 45 is located so as to detect the nitrogen oxide that is generated in the motor bearings 31 and 32. The nitrogen oxide sensor 45 of the present embodiment is disposed near the motor bearings 31 and 32. The nitrogen oxide sensor 45 of the present embodiment is fixed to the case 18 of the spindle motor 11.

The gas sensor of the failure detection device 20 includes a hydrogen sulfide sensor 46 that detects the generation of hydrogen sulfide. The hydrogen sulfide sensor 46 is formed so as to detect the concentration of hydrogen sulfide. The hydrogen sulfide sensor 46 is located so as to detect hydrogen sulfide that is generated in the oil seal 33. The hydrogen sulfide sensor 46 of the present embodiment is disposed near the oil seal 33. The hydrogen sulfide sensor 46 of the present embodiment is fixed to the case 18 of the spindle motor 11. The hydrogen sulfide sensor 46 may be disposed in the case 18 of the spindle motor 11. Alternatively, the hydrogen sulfide sensor may be fixed to the housing 17.

The failure detection device 20 includes a humidity sensor 42 that detects the humidity of an inner space of the spindle head 6. The housing 17 has a space in which the spindle 14 is arranged. The humidity sensor 42 is disposed so as to detect the humidity of the inner space. The humidity sensor 42 of the present embodiment is fixed to the housing 17. The humidity sensor 42 detects an increase in humidity from the humidity of the spindle head 6 under normal condition.

The failure detection device 20 includes a vibration sensor 41 that detects the vibration of the spindle head 6. The vibration sensor 41 is located so as to detect the magnitude of vibration of the housing 17. The vibration sensor 41 of the present embodiment is fixed to the housing 17 of the spindle head 6. The vibration sensor 41 detects an increase in vibration value from the vibration value of the spindle head 6 under normal condition.

In the present embodiment, the vibration sensor is disposed on the spindle head 6. The present invention is not limited to this configuration. The vibration sensor may be replaced with a sensor for detecting elastic wave that is generated on the spindle head. The sensor for detecting elastic wave is referred to as AE (Acoustic Emission) sensor. When AE sensor is adopted, the occurrence of the abnormality can be determined or the occurrence of the abnormality can be predicted by using, for example, the intensity (amplitude) of elastic wave that propagates through the housing instead of the intensity (amplitude) of the vibration that is detected by the vibration sensor. In the following explanation, the vibration sensor will be illustrated instead of the AE sensor.

In the present embodiment, the gas sensor for detecting a concentration of a specific gas component is arranged. The present invention is not limited to this configuration. The gas sensor may be replaced with an odor sensor 44 that detects the generation of the gas in the spindle head 6. The odor sensor 44 may be, for example, a biosensor in which a protein material reacting to the specific component is used. Also in the odor sensor, the concentration of a specific gas component can be detected. Alternatively, the odor sensor that is capable of detecting the concentrations of a plurality of gas components may be used. In the following explanation, the gas sensor will be illustrated as example among the gas sensor and the odor sensor.

The failure detection device 20 includes first sensor that detects the generation of predetermined first gas in the spindle head 6. The failure detection device 20 includes second sensor that detects a change in a state of the spindle head 6, which is different from the generation of the first gas. The second sensor is one of a gas sensor that detects the generation of predetermined second gas, a vibration sensor that detects the vibration of the spindle head, or a humidity sensor that detects the internal humidity of the spindle head. These sensors can be disposed in the machine tool 1.

The machine controller 2 includes a determination unit 10 that determines the occurrence of the abnormality based on the output values of more than one sensors. The determination unit 10 acquires the output value of the first sensor and the output value of the second sensor. For example, the determination unit 10 acquires the output value of the first sensor and the output value of the second sensor at predetermined time intervals. The vibration sensor 41 can detect the magnitude of vibration in a period other than the machining period of workpieces. For example, the magnitude of vibration can be detected in a period during which the spindle motor has a load of 0, for example, immediately before the machining of the workpiece or immediately after the machining of the workpiece.

The determination unit 10 determines the member in which the abnormality occurs among the bearings and the oil seal and the cause of the abnormality based on a change in the output value of the first sensor over time and a change in the output value of the second sensor over time. The determination unit 10 determines the defective member and the cause of the failure based on the output value of another gas sensor, the output value of the vibration sensor, or the output value of the humidity sensor in addition to the output value of one gas sensor. An example of control for determining the member in which the abnormality occurs and the cause of the abnormality will be discussed below.

Figure 4:
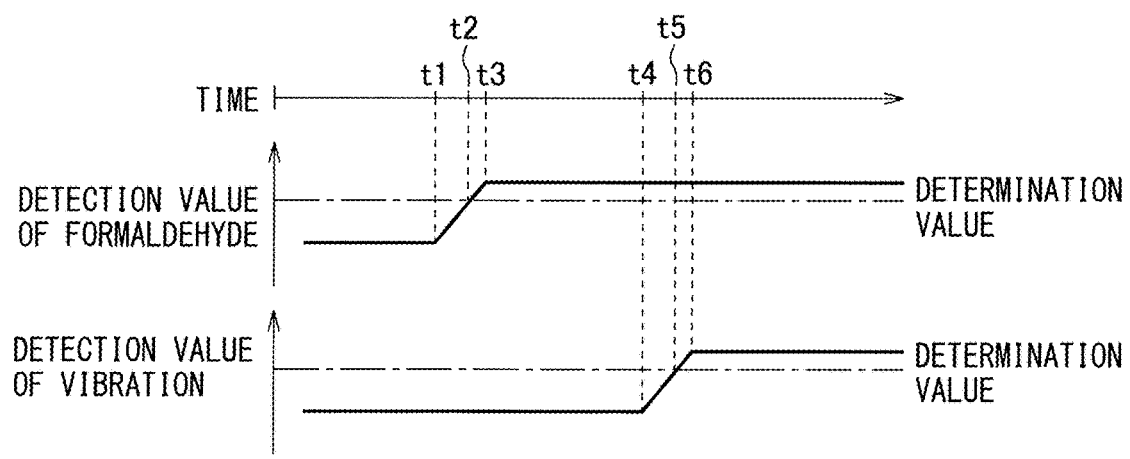
FIG. 4 is a time chart showing the output values of sensors in the event of an abnormality of the spindle bearing.

FIG. 4 shows a time chart of control for detecting the abnormality of the spindle bearing. Referring to FIGS. 1, 2, and 4, the spindle bearings 34 and 35 are, for example, angular bearings. The spindle bearings 34 and 35 of the present embodiment are formed with a large DMN value (the center diameter of the rolling element×rotation speed) and resistance to a radial load. The cages of the spindle bearings 34 and 35 are made of a phenol resin. As a lubricant, for example, lithium soap grease is used. If the grease deteriorates so as to cause metallic contact between the balls and the cage, the balls and the cage reach high temperatures. When the cage reaches a high temperature, formaldehyde is generated by the cage. Since the lubricant of the present embodiment is lithium soap grease, nitrogen oxide gas or the like is not generated from the lubricant even when the temperature of the balls and the cage increases. Furthermore, if the spindle bearings 34 and 35 are damaged, the vibration increases after the generation of formaldehyde.

If the output value of the vibration sensor 41 serving as the second sensor increases after the output value of the formaldehyde sensor 47 serving as the first sensor increases, the determination unit 10 of the machine controller 2 determines that the spindle bearings 34 and 35 are abnormal due to deterioration of the lubricant.

The determination unit 10 acquires the output value of the formaldehyde sensor 47 and the output value of the vibration sensor 41. The determination unit 10 detects that the output value of the formaldehyde sensor 47 has reached a predetermined determination value of formaldehyde or more. Thereafter, the determination unit 10 detects that the output value of the vibration sensor 41 has reached a predetermined determination value of vibration or more. In this case, the determination unit 10 determines that the spindle bearings 34 and 35 are abnormal. Moreover, the determination unit 10 determines that the abnormality is caused by deterioration of the grease that is applied to the spindle bearings 34 and 35. The determination value of formaldehyde and the determination value of vibration are determined in advance and are stored in the storage unit 3.

In the example of FIG. 4, the detection value of formaldehyde remains substantially constant until time t1. For example, the concentration of formaldehyde that is detected by the formaldehyde sensor 47 is 0. At time t1, the detection value of formaldehyde begins to increase. At time t2, the detection value of formaldehyde reaches the determination value of formaldehyde. From time t3, the detection value of formaldehyde remains substantially constant. At time t2, the determination unit 10 detects that the detection value of formaldehyde has reached the determination value or more.

Until time t4, the detection value of vibration remains substantially constant. At time t4, the detection value of vibration begins to increase. At time t5, the detection value of vibration has reached the determination value of vibration. From time t6, the detection value of vibration remains constant. At time t5, the determination unit 10 detects that the detection value of vibration has reached the determination value of vibration or more. At time t5, the determination unit 10 determines that the spindle bearings 34 and 35 are abnormal. Moreover, the determination unit 10 determines that the abnormality is caused by deterioration of the grease.

The determination unit 10 transmits, to the display unit 9, a signal that indicates the occurrence of the abnormality in the spindle bearings 34 and 35 and the cause of the abnormality. The display unit 9 displays the occurrence of the abnormality in the spindle bearings 34 and 35 and deterioration of the grease as the cause of the abnormality.

In this way, the machine controller 2 can detect the occurrence of the abnormality in the spindle bearings 34 and 35 and the cause of the abnormality. The occurrence of the abnormality in the spindle bearings 34 and 35 may be also determined under the condition where at least one sensor other than the formaldehyde sensor 47 and the vibration sensor 41 has a constant output value. For example, the occurrence of the abnormality may be also determined under the condition where the output value of the nitrogen oxide sensor 45 and the output value of the hydrogen sulfide sensor 46 remain substantially constant.

Figure 5:
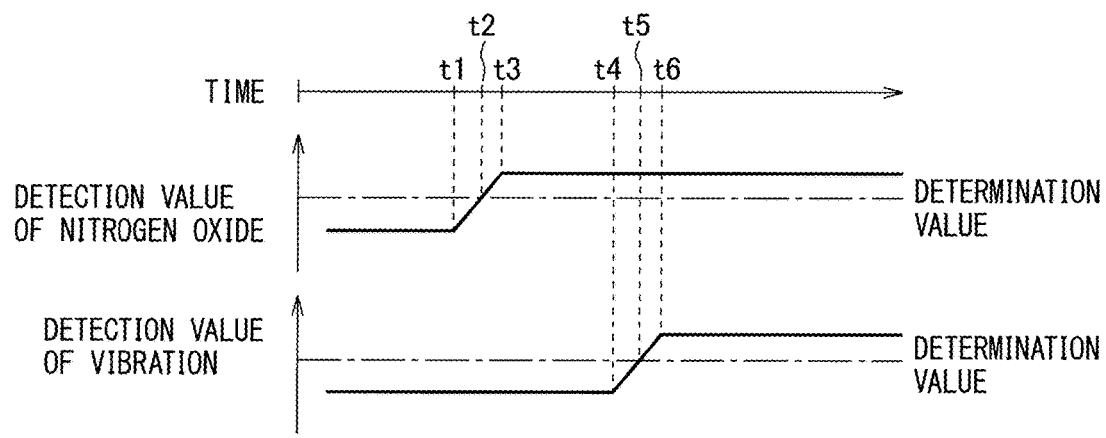
FIG. 5 is a time chart showing the output values of the sensors in the event of an abnormality of the motor bearing.

FIG. 5 shows a time chart of control for detecting the abnormality of the motor bearing. Referring to FIGS. 1, 2, and 5, the motor bearings 31 and 32 are disposed in the spindle motor 11. The spindle motor 11 is driven and generates heat such that the spindle motor 11 reaches a high temperature. The urea grease is used as the lubricant for the motor bearings 31 and 32. If the grease deteriorates so as to cause metallic contact between the balls and the inner ring or the outer ring, the part that cause metallic contact reaches a high temperature. When the temperature of the urea grease becomes high, the nitrogen oxide is generated. If the motor bearings 31 and 32 are damaged, the vibration increases after the generation of the nitrogen oxide.

If the output value of the vibration sensor 41 serving as the second sensor increases after the output value of the nitrogen oxide sensor 45 serving as the first sensor increases, the determination unit 10 of the machine controller 2 determines that the motor bearings 31 and 32 have become abnormal due to deterioration of the urea grease.

The determination unit 10 acquires the output value of the nitrogen oxide sensor 45 and the output value of the vibration sensor 41. The determination unit 10 detects that the output value of the nitrogen oxide sensor 45 has reached a predetermined determination value of nitrogen oxide or more. Thereafter, the determination unit 10 detects that the output value of the vibration sensor 41 has reached the predetermined determination value of vibration or more. In this case, the determination unit 10 determines that the motor bearings 31 and 32 are abnormal. Moreover, the determination unit 10 determines that the abnormality is caused by deterioration of the grease that is applied to the motor bearings 31 and 32. The determination value of nitrogen oxide and the determination value of vibration are determined in advance and are stored in the storage unit 3.

In the example of FIG. 5, until time t1, the detection value of nitrogen oxide remains substantially constant. For example, the concentration of nitrogen oxide detected by the nitrogen oxide sensor 45 is 0. At time t1, the detection value of nitrogen oxide begins to increase. At time t2, the detection value of nitrogen oxide reaches the determination value of nitrogen oxide. From time t3, the detection value of nitrogen oxide remains substantially constant.

After the detection value of nitrogen oxide increases, the detection value of vibration remains substantially constant until time t4. At time t4, the detection value of vibration begins to increase. At time t5, the detection value of vibration reaches the determination value of vibration. From time t6, the detection value of vibration remains substantially constant. At time t5, the determination unit 10 detects that the detection value of vibration has reached the determination value of vibration or more. At time t5, the determination unit 10 determines that the motor bearings 31 and 32 are abnormal. Moreover, the determination unit 10 determines that the abnormality is caused by deterioration of the grease.

The determination unit 10 transmits, to the display unit 9, a signal indicating the occurrence of the abnormality in the motor bearings 31 and 32 and the cause of the abnormality. The display unit 9 displays the occurrence of the abnormality in the motor bearings 31 and 32 and deterioration of the grease as the cause of the abnormality.

In this way, the machine controller 2 can detect the occurrence of the abnormality in the motor bearings 31 and 32 and the cause of the abnormality. The occurrence of the abnormality in the motor bearings 31 and 32 may be also determined under the condition where at least one sensor other than the nitrogen oxide sensor 45 and the vibration sensor 41 outputs a constant output value.

Figure 6:
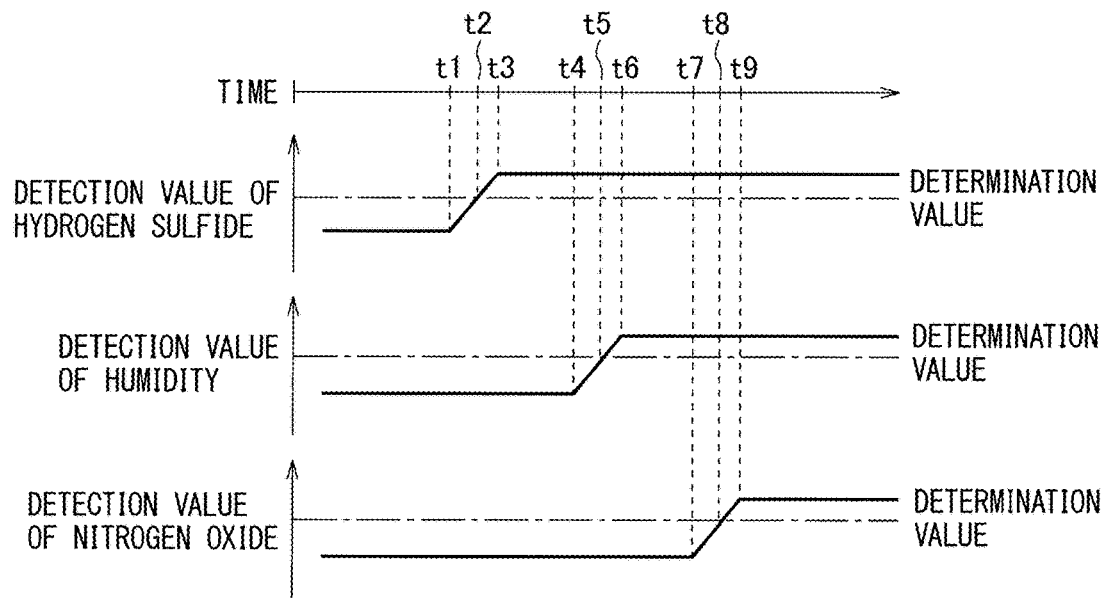
FIG. 6 is a time chart showing the output values of the sensors when abnormalities occur in the oil seal and the motor bearing.

FIG. 6 shows a time chart of control for detecting the abnormality of the oil seal. Referring to FIGS. 1, 3, and 6, the oil seal 33 is partially exposed into the machining chamber of the machine tool 1. The oil seal 33 comes into contact with coolant during the machining period of the workpiece. Thus, chips may be bitten between the shaft 12 of the spindle motor 11 and the oil seal 33. In this case, the temperature of the elastic member 37 of the oil seal 33 is raised and burned due to friction with chips. Since the elastic member 37 of the present embodiment is made of a nitrile rubber, hydrogen sulfide is generated by burning the elastic member 37. Thereafter, the oil seal 33 rise in temperature, whereby the case 18 of the spindle motor 11 and the housing 17 rise in temperature. The temperature increase in the housing 17 raises the internal humidity of the housing 17.

If the output value of the humidity sensor 42 serving as the second sensor increases after the output value of the hydrogen sulfide sensor 46 serving as the first sensor increases, the determination unit 10 of the machine controller 2 according to the present embodiment determines that the oil seal 33 is abnormal due to the biting of the foreign matter.

The determination unit 10 acquires the output value of the hydrogen sulfide sensor 46 and the output value of the humidity sensor 42. The determination unit 10 detects that the output value of the hydrogen sulfide sensor 46 has reached a predetermined determination value of hydrogen sulfide or more. Thereafter, the determination unit 10 detects that the output value of the humidity sensor 42 has reached a predetermined determination value of humidity or more. In this case, the determination unit 10 determines that the oil seal 33 is abnormal. Moreover, the determination unit 10 determines that the damage to the oil seal is caused by the biting of the foreign matter. The determination value of hydrogen sulfide and the determination value of humidity are determined in advance and are stored in the storage unit 3.

In the example of FIG. 6, the detection value of hydrogen sulfide remains substantially constant until time t1. For example, the concentration of hydrogen sulfide detected by the hydrogen sulfide sensor 46 is 0. At time t1, the detection value of hydrogen sulfide begins to increase. At time t2, the detection value of hydrogen sulfide reaches the determination value of hydrogen sulfide. From time t3, the detection value of hydrogen sulfide is substantially kept constant.

After the detection value of hydrogen sulfide begins to increase, the detection value of humidity remains substantially constant until time t4. At time t4, the internal humidity of the spindle head 6 begins to increase. At time t5, the detection value of humidity reaches the determination value of humidity. From time t6, the detection value of humidity remains substantially constant. At time t5, the determination unit 10 detects that the oil seal 33 is abnormal. Moreover, the determination unit 10 determines that the abnormality is caused by the biting of the foreign matter.

The determination unit 10 transmits, to the display unit 9, a signal indicating the occurrence of the abnormality in the oil seal 33 and the cause of the abnormality. The display unit 9 displays the occurrence of the abnormality in the oil seal 33 and the biting of the foreign matter as the cause of the abnormality. In this way, the machine controller 2 can detect the occurrence of the abnormality in the oil seal 33 and the cause of the abnormality. The occurrence of the abnormality in the oil seal 33 may be also determined under the condition where at least one sensor other than the hydrogen sulfide sensor 46 and the humidity sensor 42 outputs a constant output value.

The display unit 9 may be controlled so as not to display the abnormality of the oil seal 33. Alternatively, the control in which the abnormality of the oil seal 33 is not detected may be performed. In such a case, if the machining by the machine tool 1 is continued, the coolant enters the inside of the spindle motor 11 from a damaged part of the oil seal 33. As a result, the motor bearing 31 may be damaged.

In the control of FIG. 6, the abnormality of the motor bearings 31 and 32 is detected in addition to the abnormality of the oil seal 33. From time t6, the determination unit 10 performs the control for detecting the abnormality of the motor bearings 31 and 32. In this case, the nitrogen oxide sensor 45 acts as third sensor. If the output value of the nitrogen oxide sensor 45 increases after the output value of the humidity sensor 42 increases, the determination unit 10 of the machine controller 2 determines that the motor bearings 31 and 32 are abnormal. Furthermore, the determination unit 10 determines that the abnormality is caused by liquid that enters into the inside of the spindle motor 11.

At time t7, the determination unit 10 detects that the detection value of nitrogen oxide begins to increase. At time t8, the determination unit 10 detects that the detection value of nitrogen oxide reaches the determination value of nitrogen oxide or more. From time t8, the detection value of nitrogen oxide remains constant. The determination unit 10 detects that the detection value of hydrogen sulfide, the detection value of humidity, and the detection value of nitrogen oxide have increased in this order. The determination unit 10 of the present embodiment detects that the detection value of hydrogen sulfide, the detection value of humidity, and the detection value of nitrogen oxide reach the determination values in this order. At time t8, the determination unit 10 determines that the motor bearings 31 and 32 are abnormal. In this case, the determination unit 10 determines that the motor bearings 31 and 32 are abnormal because the oil seal 33 is damaged by the biting of the foreign matter and the liquid enters into the spindle motor 11.

The determination unit 10 transmits, to the display unit 9, a signal indicating the occurrence of the abnormalities in the oil seal 33 and the motor bearings 31 and 32 and the cause of the abnormalities. The display unit 9 displays the occurrence of the abnormality in the oil seal 33 and the biting of the foreign matter as the cause of the abnormality. Furthermore, the display unit 9 displays the occurrence of the abnormality in the motor bearings 31 and 32 and the entry of the liquid as the cause of the abnormality.

As described above, if the output value of the second sensor increases after the output value of the first sensor increases, the failure detection device 20 of the present embodiment determines that a predetermined member is abnormal. In particular, the failure detection device 20 determines the abnormal member and the cause of the abnormality based on the order in which the output values of the sensors increase. The failure detection device 20 of the present embodiment can determine the cause of the abnormality in addition to the abnormal member.

The sensors of the present embodiment are formed so as to detect the concentration of gas, humidity, or the magnitude of vibration. The present invention is not limited to this configuration. Sensors that are capable of detecting the generation of gas, an increase in humidity, or an increase in vibration can be used.

In the control of the present embodiment, when the determination unit 10 detects the abnormality, the display unit 9 displays the member in which the abnormality occurs and the cause of the abnormality. By adopting this control, the operator can see the display of the display unit 9 and perform an arbitrary control. For example, the operator can stop the machine tool 1 and change an abnormal member.

The failure detection device 20 of the present embodiment can notify the operator of the member in which the abnormality occurs and the cause of the abnormality. Thus, the operator can quickly recognize the member in which the abnormality occurs. The operator only needs to change the abnormal member without changing other parts. Hence, the operator can fix the spindle head 6 in a short time. The reduction in the operation rate of the machine tool 1 due to the failure of the spindle head 6 can be suppressed. Furthermore, the operator can recognize the cause of failure and thus can examine a measure for the failure.

The control after detecting the abnormality by the determination unit 10 is not limited to the control for displaying the notification to the operator on the display unit 9, and thus any control may be used. For example, the determination unit 10 transmits, to the operation control unit 4, a signal indicating the occurrence of the abnormality of a predetermined member. The operation control unit 4 can stop machining based on the machining program 7. Alternatively, the operation control unit 4 can control for reducing the rotation speed of the feed axis motor 5. Alternatively, the machine controller 2 may perform control so as to notify devices other than the machine tool 1 of the occurrence of the abnormality and the cause of the abnormality.

Figure 7:
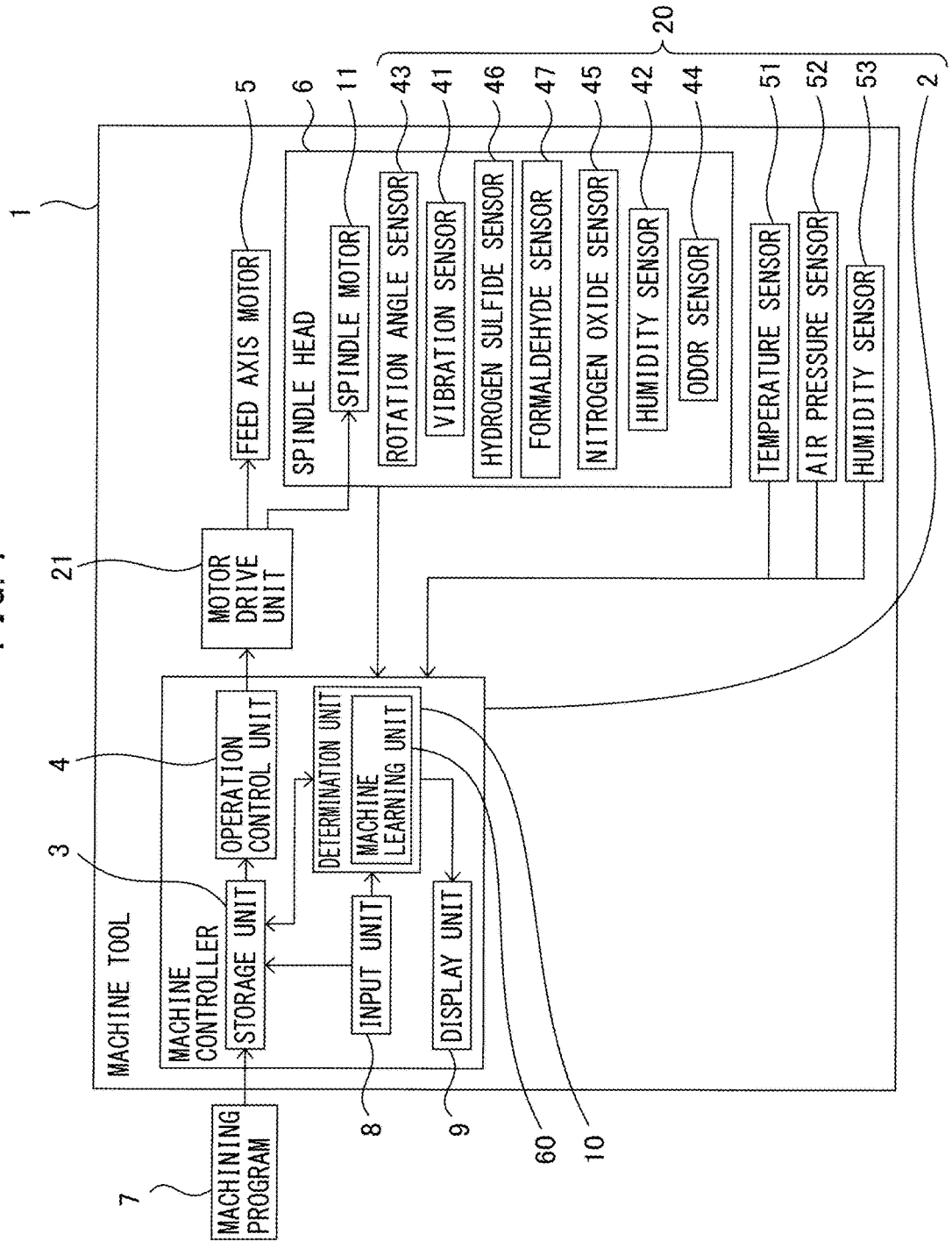
FIG. 7 is a block diagram of second machine tool according to the embodiment.
Figure 8:
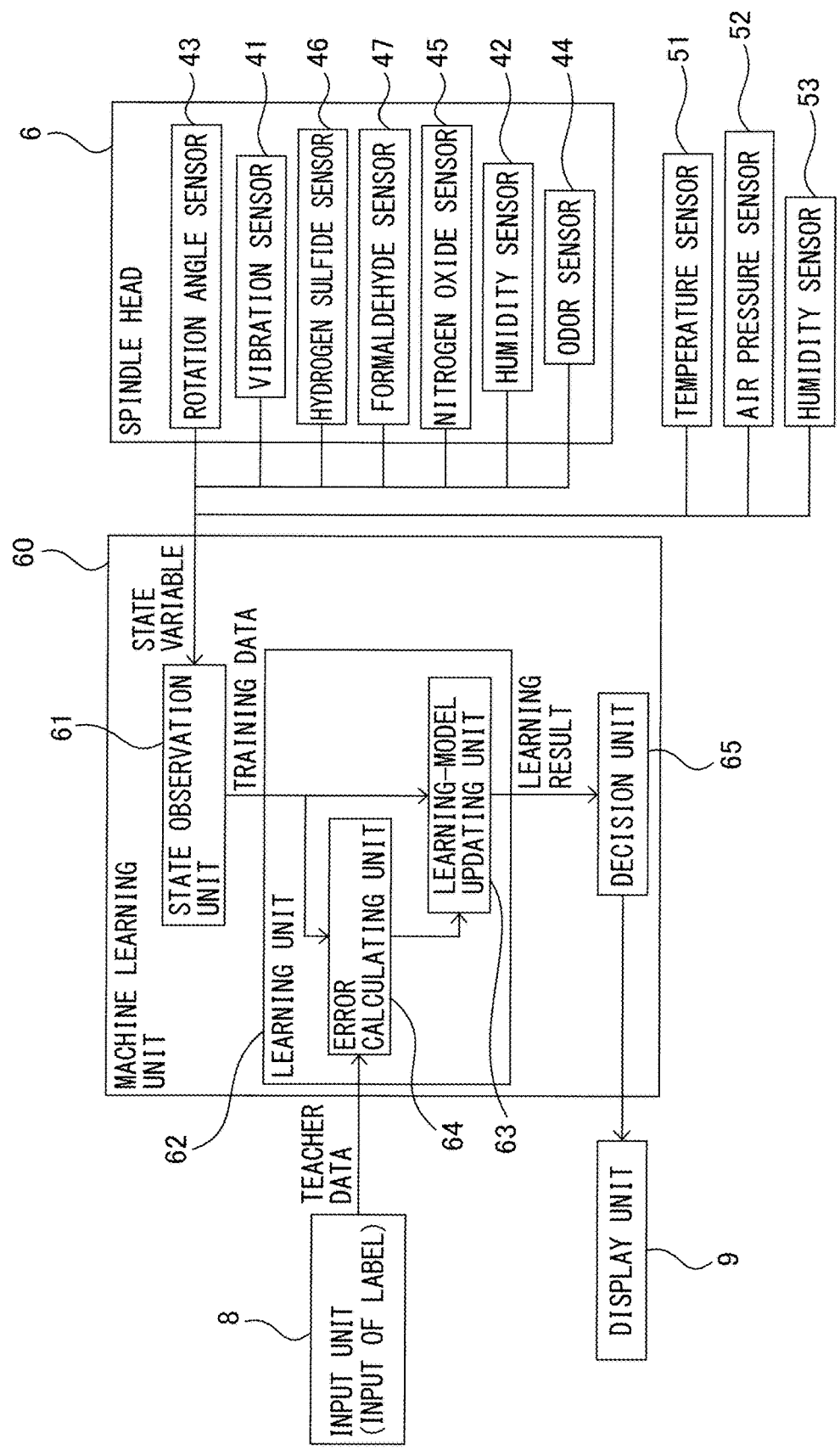
FIG. 8 is a block diagram of a machine learning unit according to the embodiment.

FIG. 7 shows a block diagram of second machine tool according to the present embodiment. FIG. 8 shows a block diagram of a machine learning unit disposed in a machine controller. Referring to FIGS. 7 and 8, a determination unit 10 in a machine controller 2 of the second machine tool 1 includes a machine learning unit 60 for machine learning. The machine learning unit 60 has the function of extracting useful rules, knowledge, expressions, and criteria through analysis from data sets to be inputted, gaining the knowledge, and outputting determination result.

The machine learning unit 60 includes a state observation unit 61 and a learning unit 62. The machine learning unit 60 of the present embodiment performs supervised learning. In supervised learning, the machine learning unit 60 receives teacher data, i.e., a large number of inputted data pairs including inputs and results (labels). The machine learning unit 60 learns feature that is included in the inputted data sets. The machine learning unit 60 generates a model (learning model) for estimating a result from an input, i.e., a model for inductively determining the relationship of the result with the input. Supervised learning can be performed by using an algorithm such as a neural network. The learning model corresponds to the algorithm, e.g., the neural network. The neural network will be discussed below.

Figure 9:
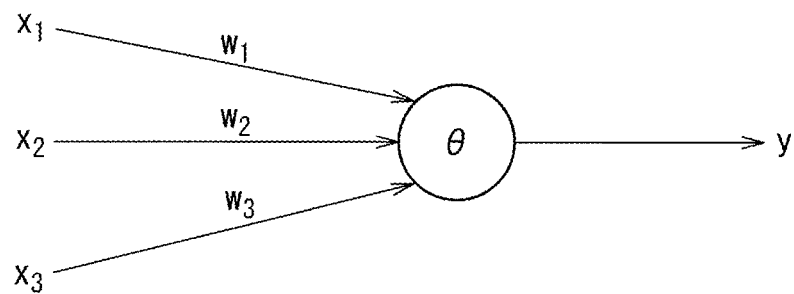
FIG. 9 is a schematic diagram showing a neuron model.

FIG. 9 is a schematic diagram showing a model of a neuron that is included in the neural network. The neural network can be formed by a calculator for obtaining a neural network simulating the neuron model in FIG. 9, etc.

The neuron provides outputs y for a plurality of inputs x (e.g., inputs x1 to x3 in FIG. 9). Each of the inputs x1 to x3 is multiplied by the weight w (w1 to w3) that corresponds to the input x. Thus, the neuron outputs the output y that is expressed by equation (1). Moreover, the input x, the output y, and the weight w are all vectors. In the next equation (1), θ is a bias and fk is an activation function.

$$y = f_k(\Sigma_{i=1}^n x_i w_i - \theta) \quad (1)$$

Figure 10:
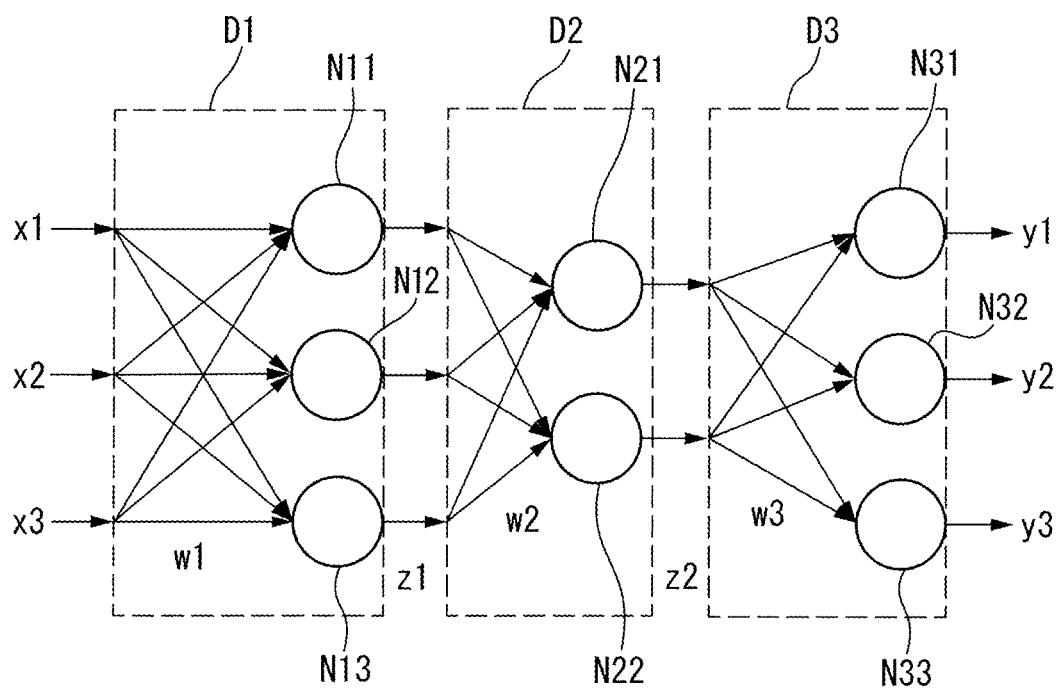
FIG. 10 is a schematic diagram of a neural network.

FIG. 10 is a schematic diagram showing the neural network. The neural network in FIG. 10 has the weights for three layers that combines the neurons that is described above. FIG. 10 is a schematic diagram that shows the neural network having the weights of three layers D1 to D3.

The plurality of inputs x (e.g., the inputs x1 to x3) are inputted from the left side of the neural network and results y (e.g., results y1 to y3) are outputted from the right side of the neural network. Specifically, the inputs x1 to x3 are inputted after multiplying by weights that correspond to three neurons N11 to N13. The weights assigned to these inputs are collectively denoted as w1.

The neurons N11 to N13 output z11 to z13, respectively. The z11 to z13 are collectively denoted as a feature vector z1 that can be regarded as a vector obtained by extracting the feature of an input vector. The feature vector z1 is the feature vector between the weight w1 and the weight w2. The z11 to z13 are inputted after multiplying by weights that correspond to two neurons N21 and N22. The weights assigned to these feature vectors are collectively denoted as w2.

The neurons N21 and N22 output z21 and z22, respectively. The z21 and z22 are collectively denoted as a feature vector z2. The feature vector z2 is a feature vector between the weight w2 and the weight w3. The feature vectors z21 and z22 are inputted after multiplying by weights that correspond to three neurons N31 to N33. The weights by which feature vectors are multiplied are collectively denoted as w3. Finally, the neurons N31 to N33 output the results y1 to y3, respectively.

The operation of the neural network has a learning mode and a prediction mode. For example, in the learning mode, the weight w is learned by using training data and teacher data. In the prediction mode, the result is outputted in the neural network where parameters such as learned weights are used.

In this case, the on-line learning can be provided such that data obtained by actually operating the machine controller in the prediction mode is instantly learned so as to be reflected in a subsequent action. Moreover, batch learning can be provided such that collective learning is conducted by using previously collected data sets and then a detection mode is continuously carried out using the parameter. Alternatively, an intermediate learning mode can be performed each time a certain amount of data is collected.

The weights w1 to w3 may be learned by error backpropagation. Error information is transmitted from the right side to the left side. Error backpropagation is a technique of adjusting (learning) weights for each neuron so as to reduce the difference between a true output y (label) and the output y for the input x. Such a neural network may have three or more layers (referred to as deep learning).

In the control of the failure detection device in the first machine tool, the abnormality of the bearing or the oil seal is determined depending on whether the output values of the sensors exceed the determination values or not. In contrast, in first control of a failure detection device in the second machine tool, the occurrence of the abnormality of the predetermined member and the cause of the abnormality are determined according to at least one of the increase rate of the output value, the increase amount of the output value, and the time from the start time of an increase in the output value of first sensor to the start time of an increase in the output value of second sensor, in addition to the output values of the sensors.

Hereinafter, the detection of the abnormality in the spindle bearings 34 and 35 will be discussed as an example. In the detection of the abnormality in the spindle bearings 34 and 35, the first sensor is the formaldehyde sensor 47. The second sensor is the vibration sensor 41.

The state observation unit 61 acquires the output value of the formaldehyde sensor 47 and the output value of the vibration sensor 41. For example, the state observation unit 61 acquires the output values of the sensors at predetermined time intervals. The state observation unit 61 calculates a state variable based on the output values of the sensors. The state variable include at least one of the output values of the respective sensors, the increase rates of the output values of the respective sensors, increase amounts of the output values of the respective sensors, and the time from the start time of the increase in the output value of the formaldehyde sensor 47 to the start time of the increase in the output value of the vibration sensor 41. Referring to FIG. 4, these variables will be described below. The output value of the formaldehyde sensor 47 will be discussed as an example.

The output value of the formaldehyde sensor 47 is the concentration of formaldehyde. In the calculation of the increase rate of the output value of the sensor, the detection value of formaldehyde when the detection value begins to increase at time t1 is used as a reference value. At any time after time t1, the detection value of formaldehyde is acquired. The difference between the detection value of formaldehyde and the reference value is divided by an elapsed time from time t1, whereby the increase rate can be calculated. The increase amount of the output value of the sensor is the difference between a detection value at any time after time t1 and the reference value. The time length from time t1 to time t4 is equivalent to the time from the start time of the increase in the output value of the formaldehyde sensor 47 to the start time of the increase in the output value of the vibration sensor 41. The state variable for the output value of the vibration sensor 41 can be calculated by the same method.

Referring to FIG. 8, the state observation unit 61 generates the training data that includes the state variable. The training data may include data that relate to the abnormalities of the respective members in addition to the state variable. The data that relate to the abnormalities of the respective members may include any information such as information on the manufacturers of the respective members and a previous replacement time. The operator can input data that relates to the abnormalities of the respective members from the input unit 8. The storage unit 3 can store data that relate to the abnormalities of the respective members. The state observation unit 61 can acquire the data that relate to the abnormalities of the respective members from the storage unit 3.

The learning unit 62 acquires teacher data. The teacher data includes information on the occurrence of the abnormality. The teacher data includes the results of the occurrence of the abnormality and the cause (label) of the abnormality. The result of the occurrence of the abnormality and the cause of the abnormality can be inputted from, for example, the input unit 8 by the operator. The teacher data includes data that corresponds to the training data associated with the label. For example, the teacher data includes at least one of the output value of the sensor when the abnormality actually occurs, the increase rate of output value, the increase amount of the output value, and the time from the start time of the increase in the output value of the formaldehyde sensor 47 to the start time of the increase in the output value of the vibration sensor 41.

The teacher data can be generated by combining the state variable that is obtained in the state observation unit 61 by driving the machine tool 1 and the label that is inputted from the input unit 8 by the operator. Alternatively, the teacher data that is obtained by, for example, a simulation may be used in a device other than the machine controller 2.

The learning unit 62 includes an error calculating unit 64 that calculates an error based on the training data and the teacher data. The learning unit 62 includes a learning-model updating unit 63 that updates the learning model for determining the occurrence of the abnormality of the predetermined member and the cause of the abnormality. The learning-model updating unit 63 updates the learning model based on the output of the state observation unit 61 and the output of the error calculating unit 64.

In this case, in the learning mode of the neural network, the learning-model updating unit 63 updates the learning model by using the training data and the teacher data. The learning-model updating unit 63 updates the learning model such that the output calculated for the input according to the learning model approaches the label of the teacher data. For example, the process of the learning mode is performed until the state variable, the output of the learning model, and the loss function of the teacher data converge to constant values.

The machine learning unit 60 includes a decision unit 65 that determines the occurrence of the abnormality of the predetermined member and the cause of the abnormality based on the learning model that is updated in the learning unit 62. The decision unit 65 acquires current training data. The decision unit 65 obtains the learning model that is updated in the learning-model updating unit 63. The decision unit 65 determines whether the predetermined member is abnormal or not based on the learning model and the training data. In this case, the neural network is used in the prediction mode. In this configuration, it is determined whether or not the spindle bearings 34 and 35 are abnormal. The decision unit 65 determines the cause of the abnormality based on the learning model and the training data.

If the predetermined member is abnormal, the decision unit 65 transmits, to a display unit 9, a signal indicating the occurrence of the abnormality and the cause of the abnormality. The display unit 9 displays the occurrence of the abnormality of the predetermined member and the cause of the abnormality. In this case, the decision unit 65 transmits, to the display unit 9, a signal indicating the occurrence of the abnormality in the spindle bearings 34 and 35 and the cause of the abnormality. The display unit 9 displays the occurrence of the abnormality in the spindle bearings 34 and 35 and deterioration of the grease as the cause of the abnormality.

The abnormality in the motor bearings 31 and 32 and the abnormality of the oil seal 33 can be determined under the control of machine learning in the same way as the case of the spindle bearings 34 and 35. In the determination of the abnormality in the motor bearings 31 and 32, the first sensor is the nitrogen oxide sensor 45 and the second sensor is the vibration sensor 41. In the determination of the abnormality in the oil seal 33, the first sensor is the hydrogen sulfide sensor 46 and the second sensor is the humidity sensor 42.

Also in the determination of the abnormality in the motor bearings 31 and 32 and the determination of the abnormality in the oil seal 33, the state observation unit 61 can obtain state variable including at least one of the output values of the sensors, the increase rate of the output value, the increase amount of the output value, and the time from the start time of the increase in the output value of the first sensor to the start time of the increase in the output value of the second sensor. The learning unit 62 can update the learning model based on the teacher data. The decision unit 65 can determine the occurrence of the abnormality of the predetermined member and the cause of the abnormality based on the learning model.

The occurrence of the abnormality and the cause of the abnormality are determined in the machine learning unit. Thus, the abnormality can be determined in consideration of the tendency of the increase in the output value of the sensor and the timing at which the output values of the plurality of the sensors increase. This allows the machine controller 2 to determine the abnormality with higher accuracy.

Subsequently, second control for the machine learning unit 60 of the failure detection device will be described. In the second control, the timing at which the abnormality of the predetermined member occurs is estimated. Referring to FIGS. 7 and 8, the machine learning unit 60 estimates the time at which the abnormality of the predetermined member occurs based on the start time of the increase in the output value of the first sensor.

In the second control, it can be determined whether or not the predetermined member is abnormal, for example, under the control in the determination unit 10 of the machine controller 2 shown in FIG. 1. The determination unit 10 can determine that the predetermined member becomes abnormal when the output values of the plurality of sensors exceed the determination values.

In the following explanation, the abnormality in the spindle bearings 34 and 35 will be described as an example. In the determination of the abnormality of the spindle bearings 34 and 35, the first sensor is the formaldehyde sensor 47. The second sensor is the vibration sensor 41. Referring to FIGS. 4, 7, and 8, the machine learning unit 60 detects the time t1 when the output value of the formaldehyde sensor 47 begins to increase. The machine learning unit 60 estimates the time length from time t1 to the occurrence of the abnormality of the spindle bearings 34 and 35 (the duration between time t1 and time t5). Moreover, the machine learning unit 60 estimates the timing (time t5) when the spindle bearings 34 and 35 become abnormal based on the time length.

The state variable that are observed by the state observation unit 61 include the output value of the first sensor and the output value of the second sensor. In this case, the state variable include the output value of the formaldehyde sensor 47 and the output value of the vibration sensor 41. Moreover, the state variables that are observed by the state observation unit 61 include at least one of data that relate to the operation state of the spindle motor 11 and data that relate to a state around the spindle head 6.

The data that relate to the operation state of the spindle motor 11 includes, for example, the rotation speed of the spindle motor 11, the driving time of the spindle motor 11, the current supplied to the spindle motor 11, the voltage supplied to the spindle motor 11, and the torque command to the spindle motor 11. The driving time of the spindle motor 11 is an integrated time in which the spindle motor 11 is operated from a change of a predetermined member. The operator can input the timing of changing a part through the input unit 8. The drive time of the spindle motor 11 can be obtained based on the period in which the action command of the spindle motor 11 is transmitted from the operation control unit 4. The rotation speed of the spindle motor 11 can be obtained from the rotation angle sensor 43 attached to the spindle motor 11.

The current and voltage that are supplied to the spindle motor 11 can be obtained from the motor drive device 21. Alternatively, the current and voltage supplied to the spindle motor 11 can be detected based on the action command that is outputted from the operation control unit 4. The torque command to the spindle motor 11 can be obtained from the action command that is outputted from the operation control unit 4.

The data that relate to the operation state of the spindle motor 11 is not limited to this embodiment. A variable that relates to the spindle motor 11 and is changed during the operation of the spindle motor 11 can be employed.

The data that relate to a state around the spindle head 6 includes temperature, air pressure, and humidity around the spindle head 6. The temperature around the spindle head 6 can be detected by a temperature sensor 51 that is disposed near the spindle head 6. The air pressure around the spindle head 6 can be detected by an air pressure sensor 52 that is disposed near the spindle head 6. The humidity around the spindle head 6 can be detected by a humidity sensor 53 that is disposed near the spindle head 6. The temperature sensor 51, the air pressure sensor 52, and the humidity sensor 53 can be disposed in, for example, a machining chamber in which the spindle head 6 and a table for holding the workpiece are arranged.

The data that relate to the state around the spindle head 6 is not limited to this embodiment. The data may include any variable that changes around the spindle head 6.

The state observation unit 61 generates the training data that includes the state variable. The training data may include data that relate to abnormalities of the respective members in addition to the state variable. The data that relate to abnormalities of the respective members may include the manufacturer of the bearing or the oil seal.

The learning unit 62 acquires the teacher data that includes the timing of the occurrence of the abnormality. The teacher data includes the result of the time length (label) from the start time of the increase in the output value of the first sensor to the time of determination of the abnormality. This label can be inputted from, for example, the input unit 8 by the operator. The teacher data includes data that corresponds to the training data and is associated with the label. The teacher data includes at least one of the data that relates to an operation state of the spindle motor 11 and the data that relates to a state around the spindle head 6.

The error calculating unit 64 of the learning unit 62 calculates an error based on the training data and the teacher data. The learning-model updating unit 63 of the learning unit 62 updates the learning model for estimating the timing when the predetermined member becomes abnormal, based on the output of the state observation unit 61 and the output of the error calculating unit 64. In this case, the learning-model updating unit 63 updates the learning model for estimating the time length from the start time of the increase in the detection value of formaldehyde and the time when the detection value of vibration reaches the determination value.

The decision unit 65 acquires training data that includes a current state variable. The decision unit 65 acquires the learning model that is updated in the learning-model updating unit 63. The decision unit 65 estimates the time length from the start time of the increase in the detection value of formaldehyde to the time when the detection value of vibration reaches the determination value, based on the learning model that is updated in the learning unit 62. Subsequently, the decision unit 65 estimates the timing when the spindle bearings 34 and 35 become abnormal based on the start time of the increase in the detection value of formaldehyde and the time length.

The decision unit 65 transmits a signal of the estimated timing to the display unit 9. The display unit 9 displays the timing when the spindle bearings 34 and 35 become abnormal. The operator can be informed of the timing when the spindle bearings 34 and 35 become abnormal. In other words, the operator can be informed of the timing of failures of the spindle bearings 34 and 35.

In the above explanation, the spindle bearings 34 and 35 are described as an example and the timing when the abnormality occurs is estimated. The timing when the motor bearings 31 and 32 become abnormal and the timing when the oil seal 33 becomes abnormal can be also estimated under the same control as the estimation of the timing when the spindle bearings 34 and 35 become abnormal.

The second control of the machine learning unit 60 can estimate the timing when the predetermined member becomes abnormal in consideration of the operation state of the spindle motor 11 and the state around the spindle head 6. This allows the operator to prepare a part to be changed or to correct the operation plan of the machine tool.

In the second control of the machine learning unit 60, the timing of occurrence of the abnormality is predicted based on the start time of the increase in the output value of the first sensor, but the embodiment is not limited to this. The timing of the occurrence of the abnormality can be predicted based on arbitrary time.

For example, the timing of the occurrence of the abnormality may be estimated based on the time when the output value of the first sensor exceeds the determination value. Alternatively, the timing of the occurrence of the abnormality may be estimated based on the time when the output value of the first sensor is increased and then remains constant.

In the first control and the second control of the machine learning unit, the relationship between the sensor in which the output value increases and the member in which the abnormality occurs is determined beforehand. For example, if the concentration of formaldehyde rises and the vibration increases, it is determined that the spindle bearing is abnormal. The machine learning is not limited to this embodiment. The relationship between the member in which the abnormality occurs and the sensor in which the output value increases may not be determined. For example, the learning unit can obtain the output values of all the sensors as state variables. The member in which the abnormality occurs may be determined or the timing of the occurrence of the abnormality may be estimated based on teacher data that relates to the output values of all sensors.

In the forgoing embodiment, the machine controller 2 that controls the operation of the machine tool 1 includes the machine learning unit 60 having the function of machine learning. The present invention is not limited to this configuration. The machine learning unit may be configured by a device other than the machine controller. The machine learning unit can be configured by a calculator (arithmetic processing device) other than the machine controller. For example, a GPGPU (General-Purpose computing on Graphics Processing Units) or large PC cluster is applicable to the machine learning unit. This configuration achieves high-speed processing.

In the control of machine learning, the state variable and the teacher data may be acquired from a plurality of machine tools so as to estimate the occurrence of the abnormality of the predetermined member and the cause of the abnormality or estimate the timing of the occurrence of the abnormality. In other words, the learning model may be shared among a plurality of machine tools. This control can improve the accuracy of determination and the accuracy of prediction.

According to an aspect of the present disclosure, the failure detection device that determines the member in which the abnormality occurs and the cause of the abnormality in the spindle head of a machine tool can be provided.

The embodiment can be combined as deemed appropriate. In the drawings, the same or equivalent parts are indicated by the same symbols. The embodiment is merely exemplary and does not limit the invention. The embodiment includes modifications described in claims.

The invention claimed is:

1. A failure detection device for detecting an abnormality of a spindle head of a machine tool, comprising:
 a first sensor that detects generation of a predetermined first gas in the spindle head;
 a second sensor that detects a change in a state of the spindle head that is different from the generation of the first gas; and
 a controller that determines whether a bearing arranged in the spindle head is abnormal or not, wherein
 the controller is configured to determine occurrence of the abnormality in the bearing and a cause of the abnormality based on a change in an output value of the first sensor over time and a change in an output value of the second sensor over time,
 the bearing is a spindle bearing that supports a spindle,
 the spindle bearing has a cage made of phenol resin and a lubricant disposed in the spindle bearing,
 the first sensor is a gas sensor or an odor sensor that detects formaldehyde,
 the second sensor is one of a vibration sensor that detects vibration of the spindle head or a sensor that detects an elastic wave generated in the spindle head, and
 the controller determines that the spindle bearing is abnormal due to deterioration of the lubricant if the output value of the second sensor increases after the output value of the first sensor increases.

2. The failure detection device according to claim 1, wherein the controller includes a display unit that displays a member in which the abnormality occurs and the cause of the abnormality.

3. The failure detection device according to claim 1, wherein
 the controller includes a machine learning unit that performs supervised learning,
 the machine learning unit including:
  a state observation unit that observes a state variable including at least one of the output values of the first sensor and the second sensor, increase rates of the output values, increase amounts of the output values, and a time from a start time of an increase in the output value of the first sensor to a start time of an increase in the output value of the second sensor;
  a learning unit that acquires teacher data including information on occurrence of the abnormality and updates a learning model, based on the teacher data, for determining whether a predetermined member is abnormal or not; and
  a decision unit that acquires a current state variable and determines whether or not the abnormality occurs based on the current state variable and the learning model.

4. The failure detection device according to claim 1, wherein
 the controller includes a machine learning unit that performs supervised learning,
 the machine learning unit including:
  a state observation unit that observes a state variable including output values of a plurality of sensors and at least one of data relating to an operation state of a spindle motor or data relating to a state around the spindle head;
  a learning unit that acquires teacher data including information on timing of occurrence of the abnormality and updates a learning model, based on the teacher data, for predicting timing when a predetermined member becomes abnormal; and
  a decision unit that acquires a current state variable and predicts the timing of occurrence of the abnormality based on the current state variable and the learning model.

5. A failure detection device for detecting an abnormality of a spindle head of a machine tool, comprising:
 a first sensor that detects generation of a predetermined first gas in the spindle head;
 a second sensor that detects a change in a state of the spindle head that is different from the generation of the first gas; and
 a controller that determines whether a bearing arranged in the spindle head is abnormal or not, wherein
 the controller is configured to determine occurrence of the abnormality in the bearing and a cause of the abnormality based on a change in an output value of the first sensor over time and a change in an output value of the second sensor over time,
 the bearing is a motor bearing that supports a shaft of a spindle motor,
 the motor bearing includes urea grease disposed in the motor bearing,
 the first sensor is a gas sensor or an odor sensor that detects nitrogen oxide,
 the second sensor is one of a vibration sensor that detects vibration of the spindle head or a sensor that detects an elastic wave generated in the spindle head, and
 the controller determines that the motor bearing is abnormal due to deterioration of the urea grease if the output value of the second sensor increases after the output value of the first sensor increases.

6. A failure detection device for detecting an abnormality of a spindle head of a machine tool, comprising:
 a first sensor that detects generation of a predetermined first gas in the spindle head;
 a second sensor that detects a change in a state of the spindle head that is different from the generation of the first gas; and
 a controller that determines whether an oil seal arranged in the spindle head is abnormal or not, wherein
 the controller is configured to determine occurrence of the abnormality in the oil seal and a cause of the abnormality based on a change in an output value of the first sensor over time and a change in an output value of the second sensor over time, the oil seal is disposed so as to seal an inner space of a spindle motor and includes an elastic member that is in contact with a shaft of the spindle motor and is made of nitrile rubber, the first sensor is a first gas sensor or a first odor sensor that detects hydrogen sulfide, the second sensor is a humidity sensor that detects humidity in the spindle head, and the controller determines that the oil seal is abnormal due to biting of a foreign matter if the output value of the second sensor increases after the output value of the first sensor increases.

7. The failure detection device according to claim 6, further comprising a third sensor that detects generation of nitrogen oxide in the spindle head, wherein the controller is configured to determine occurrence of the abnormality in a bearing arranged in the spindle head and a cause of the abnormality, the third sensor is a second gas sensor or a second odor sensor that detects nitrogen oxide, the bearing is a motor bearing that supports the shaft of the spindle motor, the motor bearing includes urea grease disposed in the motor bearing, and the controller determines that the motor bearing is abnormal due to entry of liquid into the spindle head if the output value of the third sensor increases after the output value of the second sensor increases.

* * * * *